United States Patent
El-Ali et al.

(10) Patent No.: US 10,938,633 B2
(45) Date of Patent: *Mar. 2, 2021

(54) FACILITATING RESILIENT AND FAULT TOLERANT ASYNCHRONOUS MESSAGING

(71) Applicant: Capital One Services, LLC, McLean, VA (US)

(72) Inventors: Hala El-Ali, Murphy, TX (US); David Gillam, The Colony, TX (US); Pedro Betancourt, McKinney, TX (US); Fredrick Crable, Allen, TX (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/929,539

(22) Filed: May 8, 2020

(65) Prior Publication Data

US 2020/0403850 A1 Dec. 24, 2020

Related U.S. Application Data

(63) Continuation of application No. 16/450,639, filed on Jun. 24, 2019, now Pat. No. 10,652,081.

(51) Int. Cl.
*H04W 4/12* (2009.01)
*H04L 12/24* (2006.01)
(Continued)

(52) U.S. Cl.
CPC ...... *H04L 41/0686* (2013.01); *G06F 11/2002* (2013.01); *H04W 4/12* (2013.01); *H04W 76/11* (2018.02)

(58) Field of Classification Search
CPC ............ G06F 16/9535; G06F 11/1471; G06F 11/2023; G06F 11/2033; G06F 11/2094;
(Continued)

(56) References Cited

U.S. PATENT DOCUMENTS 8,370,523 B1 * 2/2013 Slaughter ............ H04L 45/742
709/240
10,652,081 B1 * 5/2020 El-Ali ................ H04L 41/0686
(Continued)

OTHER PUBLICATIONS

Boner J., et al., "The Reactive Manifesto,", https://www.reactivemanifesto.org/, Sep. 16, 2014, 2 pages.

*Primary Examiner* — Phuc H Tran
(74) *Attorney, Agent, or Firm* — Harrity & Harrity, LLP

(57) ABSTRACT

A device may receive a message from a first different device that includes an identifier and may determine whether the device has previously received the message. The device may generate, based on determining that the device has not previously received the message, an additional identifier and a message status indicator and may cause the additional identifier, the message, and the message status indicator to be stored in a data structure associated with the device. The device may send an acknowledgment status to the first different device and may cause processing of the message to generate an additional message that includes the additional identifier. The device may send the additional message to a second different device and may cause, after sending the additional message to the second different device, the message status indicator in the data structure to be updated.

20 Claims, 11 Drawing Sheets

(51) Int. Cl.
*H04W 76/11* (2018.01)
*G06F 11/20* (2006.01)

(58) Field of Classification Search
CPC ............. G06F 11/3006; G06F 11/3433; G06F 15/177; G06F 16/1744; G06F 16/1748; G06F 16/178; G06F 21/602; G06F 21/6209; G06F 9/455; G06F 9/45533; G06F 9/45558; G06F 9/541; G06Q 50/01; G06Q 10/063; G06Q 10/063112; G06Q 10/063114; G06Q 10/063116
See application file for complete search history.

(56) References Cited

U.S. PATENT DOCUMENTS

| | | | |
|---|---|---|---|
| 2015/0081861 A1* | 3/2015 | Koponen | H04L 41/0806 709/222 |
| 2016/0353463 A1* | 12/2016 | Vigier | H04W 4/023 |
| 2018/0212971 A1* | 7/2018 | Costa | H04L 9/0861 |
| 2019/0102720 A1* | 4/2019 | Jennings | G06F 16/335 |
| 2019/0138410 A1* | 5/2019 | Lowney | G06F 11/1471 |
| 2019/0155813 A1* | 5/2019 | Harden | G06Q 50/01 |
| 2019/0245918 A1* | 8/2019 | Xu | G06F 16/178 |
| 2019/0250962 A1* | 8/2019 | Bussler | G06F 9/541 |

* cited by examiner

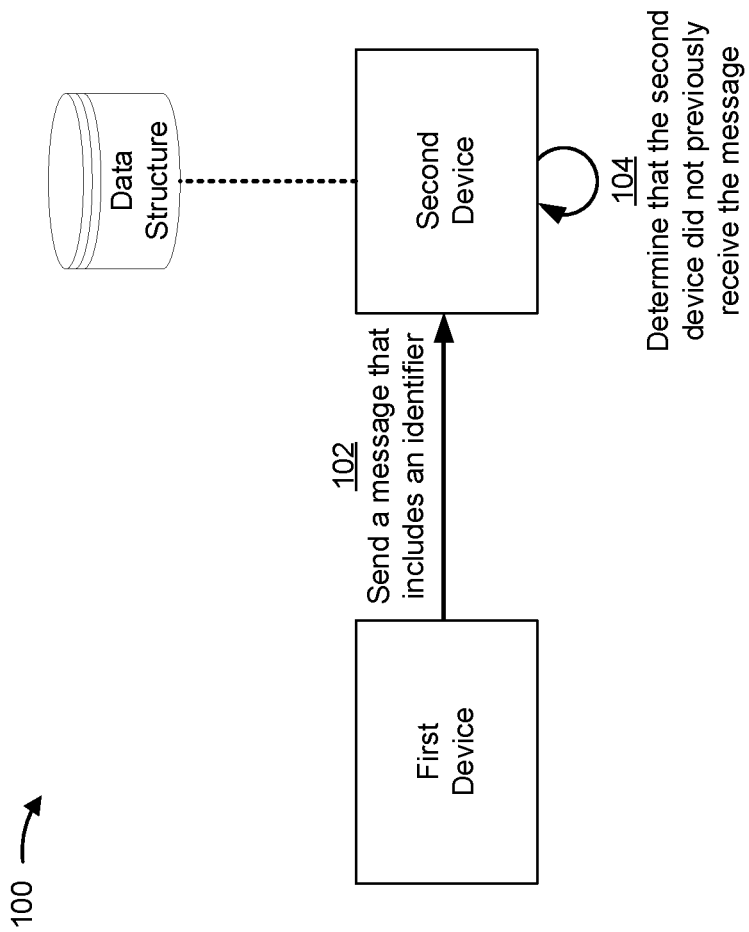

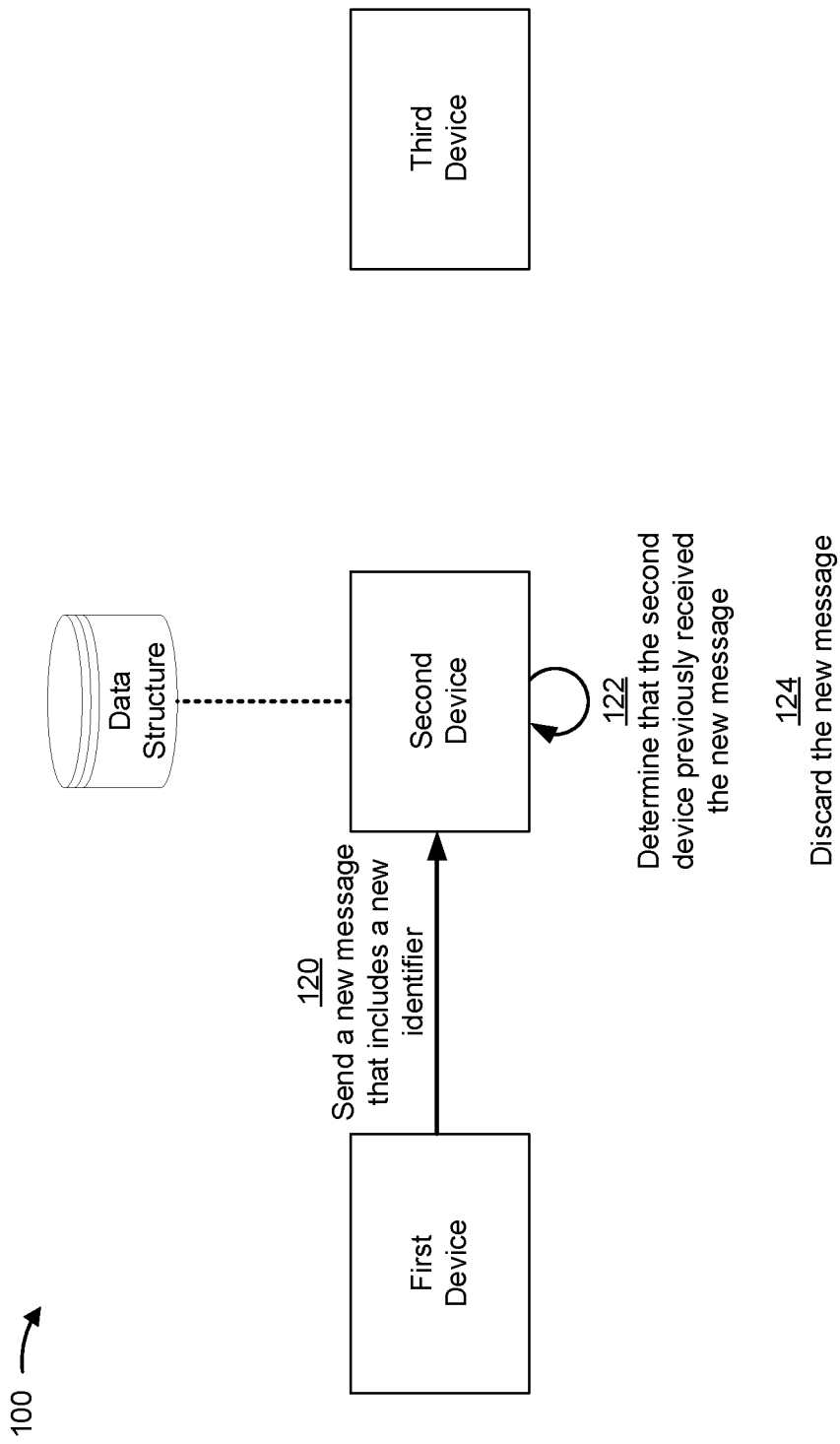

FACILITATING RESILIENT AND FAULT TOLERANT ASYNCHRONOUS MESSAGING

RELATED APPLICATION

This application is a continuation of U.S. patent application Ser. No. 16/450,639, filed Jun. 24, 2019 (now U.S. Pat. No. 10,652,081), which is incorporated herein by reference.

BACKGROUND

Asynchronous messaging allows messages to be intermittently transmitted between devices rather than in a steady stream, as in synchronous messaging. Asynchronous messaging enables a device to transmit and/or consume a message based on when the device has resources available to process the message, rather than based on a schedule.

SUMMARY

According to some implementations, a method may include receiving, by a device, a message from a first different device, wherein the message includes an identifier; determining, by the device, whether the device has previously received the message; generating, by the device and based on determining that the device has not previously received the message, an additional identifier and a message status indicator; causing, by the device, the additional identifier, the message, and the message status indicator to be stored in a data structure associated with the device; sending, by the device and after causing the additional identifier, the message, and the message status indicator to be stored in the data structure, an acknowledgment status to the first different device; causing, by the device, processing of the message to generate an additional message that includes the additional identifier; sending, by the device, the additional message to a second different device; and causing, by the device and after sending the additional message to the second different device, the message status indicator in the data structure to be updated.

According to some implementations, a device may include one or more memories; and one or more processors, communicatively coupled to the one or more memories, configured to: receive a message that includes an identifier from a different device; determine, based on the identifier included in the message, that the device has not previously received the message; generate, based on determining that the device has not previously received the message, an additional identifier and a message status indicator; cause the additional identifier, the message, and the message status indicator to be stored in a data structure associated with the device; send, after causing the additional identifier, the message, and the message status indicator to be stored in the data structure, an acknowledgment status to the different device; cause processing of the message to perform at least one action; cause, after processing of the message to perform the at least one action, the message status indicator in the data structure to be updated; receive, after causing the message status indicator in the data structure to be updated, a new message that includes a new identifier from the different device; determine, based on the new identifier included in the message, that the device has previously received the new message; and cause the device to discard the new message.

According to some implementations, a non-transitory computer-readable medium may store instructions that include one or more instructions that, when executed by one or more processors of a device, cause the one or more processors to: obtain one or more messages from a different device, wherein each message, of the one or more messages, includes a respective identifier; and wherein, for each message, of the one or more messages, the one or more instructions, when executed by the one or more processors, cause the one or more processors to: determine whether the device has previously received the message, generate, based on determining that the device has not previously received the message, an additional identifier and a message status indicator, cause the additional identifier, the message, and the message status indicator to be stored in a data structure associated with the device, and cause processing of the message to perform at least one action; send, after causing respective processing of each message of the one or more messages, an acknowledgment status concerning the one or more messages to the different device; and cause, after sending the acknowledgment status to the different device, a respective message status indicator associated with each message, of the one or more messages, in the data structure to be updated.

BRIEF DESCRIPTION OF THE DRAWINGS

FIGS. 1A-1F are diagrams of example implementations described herein.

DETAILED DESCRIPTION

Figure 1B:
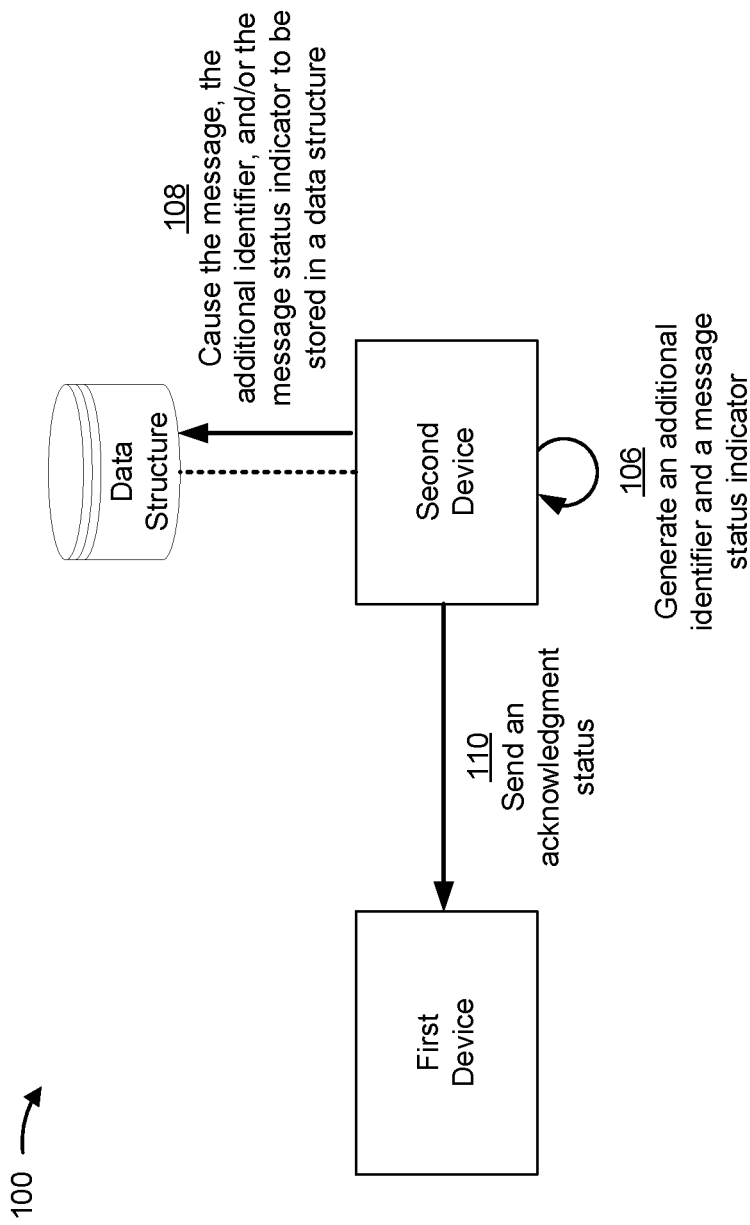

The following detailed description of example implementations refers to the accompanying drawings. The same reference numbers in different drawings may identify the same or similar elements.

In some instances, one or more devices may communicate using asynchronous messaging. For example, a first device may send a request message that requests performance of an action to a second device. The second device may send a request acknowledgment status to the first device indicating that the second device received the request message. In some cases, the second device may process the request message to cause a third device to perform the requested action. In such cases, the second device may send a response message to the first device indicating that the requested action was performed by the third device. In other cases, an error may occur that prevents the second device from causing the third device to perform the requested action and/or send the response message to the first device. Accordingly, the first device may determine, based on not receiving a response message, that an error occurred, but may not be able to determine the reason for the error.

As a result, the first device may either resend the request message to the second device, at the risk of causing the requested action to be performed for a second time (e.g., the error occurred when the second device tried to send the response message indicating that the second device caused the third device to perform the requested action), or forgo resending the request message to the second device, at the risk of the requested action never being performed at all (e.g., the error occurred when the second device tried to cause the third device to perform the requested action). This may unnecessarily consume resources (e.g., processing resources, memory resources, power resources, communication resources, and/or the like) of the first device, the second device, and/or the third device to perform duplicative actions. Additionally, or alternatively, this may unnecessarily consume resources (e.g., processing resources, memory resources, power resources, communication resources, and/or the like) of the first device, the second device, and/or the third device to remediate issues resulting from requested actions not being performed and/or from requested actions being performed more than once.

Some implementations described herein facilitate resilient and fault tolerant asynchronous messaging. In some implementations, a second device may receive a message from a first device and may determine, based on an identifier included in the message, whether the second device has previously received the message (e.g., by searching a data structure associated with the second device for stored messages that have the same identifier). In some implementations, when the second device has previously received the message, the second device may discard the message. In some implementations, when the second device has not previously received the message, the second device may generate an additional identifier and a message status indicator (e.g., that indicates the message has been untried) and may cause the additional identifier, the message, and the message status indicator to be stored in the data structure. In some implementations, the second device may send an acknowledgment status to the first device and may cause processing of the message to perform at least one action, such as to generate and send an additional message that includes the additional identifier to a third device. In some implementations, after successfully processing the message, the second device may cause the message status indicator in the data structure to be updated (e.g., to indicate that the message was processed successfully). In some implementations, after not successfully processing the message, the second device may cause the message status indicator in the data structure to be updated (e.g., to indicate that the message was not processed successfully). In some implementations, the second device may identify a stored message in the data structure (e.g., a message that was not previously processed successfully) and retry processing the stored message.

In this way, some implementations described herein may conserve resources (e.g., processing resources, memory resources, networking resources, power resources, and/or the like) of the first device, the second device, and/or the third device that would otherwise be used to perform duplicative actions and/or remediate issues resulting from requested actions not being performed and/or from requested actions being performed more than once. For example, the second device, by storing messages and relevant information in the data structure, prevents duplicate messages from being processed by the second device, thereby conserving resources of the second device and/or the third device that would otherwise be used to process the duplicate messages. As another example, the second device ensures that an unsuccessfully processed message is retried, which removes a need for the first device to resend the unsuccessfully processed message, thereby conserving resources of the first device and/or second device. Accordingly, every message that is sent to the second device is accounted for and processed to completion, which enables resilient and fault tolerant asynchronous messaging.

FIGS. 1A-1F are diagrams of an example implementation 100 described herein. As shown in FIGS. 1A through 1F, example implementation(s) 100 may include a first device, a second device, and/or a third device. The first device, the second device, and the third device may each be a computing device, a server device, a cloud computing device, and/or the like. The first device, the second device, and the third device may each be a consuming and/or producing device (e.g., representational state transfer (REST) compliant device), an event emitting and/or event receiving device (e.g., a microservice device), and/or the like. The first device, the second device, and/or the third device may be part of a system, such as a reactive microservice architecture system (e.g., an asynchronous message-based microservice communication architecture system). In some implementations, one or more additional devices may be part of the system, such that the first device, the second device, the third device, and the one or more additional devices may communicate (e.g., send and receive messages) with each other.

In some implementations, the second device, the third device, and/or the first device may be connected via a network, such as a wired network (e.g., the Internet or another data network), a wireless network (e.g., a wireless local area network, a wireless wide area network, a cellular network, and/or the like), and/or the like. The first device and the second device may communicate via an application programming interface (API), a messaging bus, and/or the like. Similarly, the second device and the third device may communicate via an API, a messaging bus, and/or the like.

As shown in FIG. 1A and by reference number 102, the second device may obtain a message from the first device. For example, the first device may send the message to the second device and/or the second device may receive the message from the first device. The second device may obtain the message from the first device via an API, a messaging bus, and/or the like. For example, the first device may add the message to a messaging bus and/or the second device may periodically poll the messaging bus to obtain the message. The second device may poll the messaging bus on a scheduled basis (e.g., every second, every minute, every 20 minutes, and/or the like), on an on-demand basis (e.g., based on receiving a signal from another device, such as the first device), on a triggered basis (e.g., based on a value associated with the second device satisfying a threshold), on an ad hoc basis (e.g., to facilitate performing additional functioning of the second device), and/or the like.

In some implementations, the message may be a representational state transfer (REST) request, a microservice event message, and/or the like. The message may include an identifier, such as a universally unique identifier (UUID), that identifies the message.

In some implementations, the second device may determine whether the second device has previously received the message. For example, the second device may parse the message to identify the identifier included in the message. The second device may determine whether any stored message in a data structure associated with the second device is associated with the identifier (e.g., the second device may search the data structure for messages that include the identifier). A stored message may be associated with the identifier when the stored message includes a stored identifier that matches the identifier.

In some implementations the second device may determine that the second device previously received the message. In such implementations, the second device may discard the message as described herein (e.g., see FIG. 1E and associated text). Additionally, or alternatively, as shown by reference number 104, the second device may determine that the second device did not previously receive the message.

As shown in FIG. 1B and by reference number 106, when the second device determines that the second device has not previously received the message, the second device may generate at least one additional identifier and/or a message status indicator. The at least one additional identifier may be a UUID (e.g., the additional identifier may be different than the identifier, as well as any other identifiers associated with other messages). The message status indicator may indicate that the message has an untried status (e.g., that the message has been received by the second device and has not been processed by the second device).

As shown by reference number 108, the second device may cause the message, the at least one additional identifier, and/or the message status indicator to be stored in a data structure. The data structure may be associated with the second device. For example, the data structure may be part of the second device. As another example, the data structure may be accessible to the second device via a network.

As shown by reference number 110, the second device may send an acknowledgment status to the first device. The acknowledgment status may indicate that the second device received the message, determined that the second device did not previously receive the message, caused the message to be stored in the data structure, and/or the like. In some implementations, the processing steps associated with reference numbers 102-110 are associated with a single transaction. The acknowledgment status may indicate that the single transaction was successful.

Figure 1C:
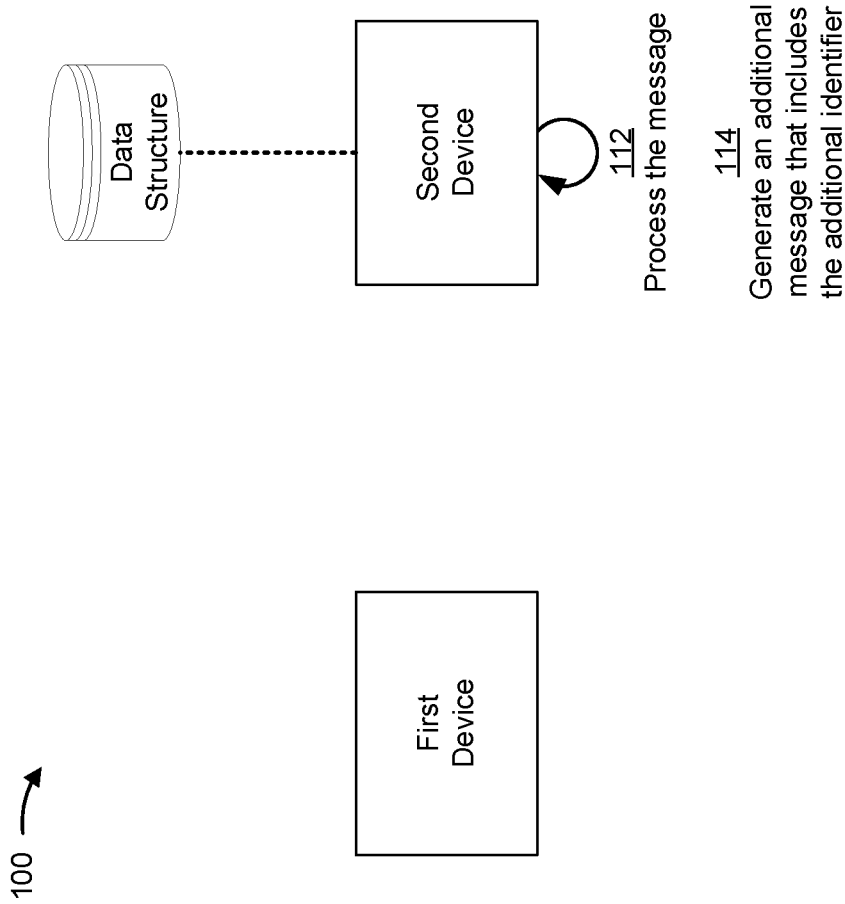

As shown in FIG. 1C and by reference number 112, the second device may process the message to perform at least one action. For example, as shown by reference number 114, the second device may process the message to generate an additional message. The second device may cause the additional message to include the additional identifier (e.g., the second device may add the additional identifier to the additional message). Additionally, or alternatively, the second device may process the message to perform an alternative action to generating an additional message, such as updating an account (e.g., a transaction account, such as a checking account, savings account, and/or the like) based on information included in the message.

Figure 1D:
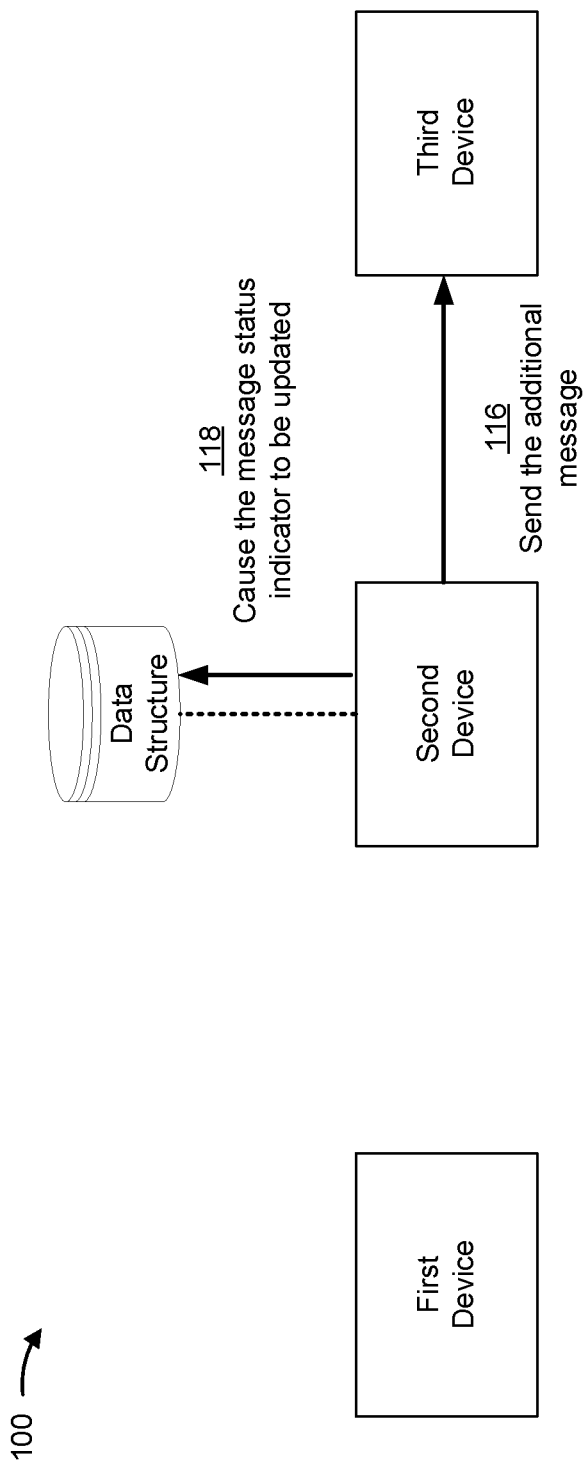

As shown in FIG. 1D and by reference number 116, the second device may send the additional message to the third device. The second device may send the additional message to the third device via an API, a messaging bus, and/or the like. For example, the second device may add the additional message to a messaging bus and/or the third device may periodically poll the messaging bus (e.g., on a scheduled basis, on an on-demand basis, on a triggered basis, on an ad hoc basis, and/or the like) to obtain the additional message.

As shown by reference number 118, the second device may cause the message status indicator to be updated in the data structure. For example, the second device may determine whether the message was processed successfully (e.g., whether the second device, based on processing the message, generated the additional message and sent the additional message to the third device, performed the alternative action, and/or the like). When the second device determines that the message was processed successfully, the second device may cause the message status indicator to indicate that the message was successfully processed. Additionally or alternatively, when the second device determines that the message was not processed successfully, the second device may determine whether processing of the message is retriable (e.g., whether a temporary resource outage issue caused the second device to not successfully process the message). When the second device determines that the processing of the messages is retriable (e.g., the message was not successfully processed because of a temporary resource outage issue), the second device may cause the message status indicator to indicate a retriable status (e.g., a status indicating that the message should be processed again). When the second device determines that the processing of the message is not retriable (e.g., the message was not successfully processed because of an issue other than a temporary resource outage issue), the second device may cause the message status indicator to indicate a terminal status (e.g., a status indicating that the message should not be processed again).

As shown in FIG. 1E and by reference number 120, the second device may obtain a new message from the first device in a similar manner as described herein in relation to FIG. 1A. For example, the first device may send the new message to the second device and/or the second device may receive the new message from the first device. The second device may obtain the new message from the first device via an API, a messaging bus, and/or the like. For example, the first device may add the message to a messaging bus and/or the front-end device may periodically poll the messaging bus (e.g., on a scheduled basis, on an on-demand basis, on a triggered basis, on an ad hoc basis, and/or the like) to obtain the new message. The new message may include a new identifier, such as a UUID, that identifies the new message. The new message may be a REST request, a microservice event message, and/or the like.

In some implementations, the second device may determine whether the second device has previously received the new message in a similar manner as described herein in relation to FIG. 1A. For example, the second device may parse the new message to identify the new identifier included in the new message. The second device may determine whether any stored message in the data structure associated with second device is associated with the new identifier (e.g., the second device may search the data structure for messages that include the new identifier). A stored message may be associated with the new identifier when the stored message includes a stored identifier that matches the new identifier.

As shown by reference number 122, the second device may determine that the second device has previously received the new message. As shown by reference number 124, the second device may discard the new message (e.g., the second device may delete the new message and/or not store the new message in the data structure associated with the second device).

Figure 1F:
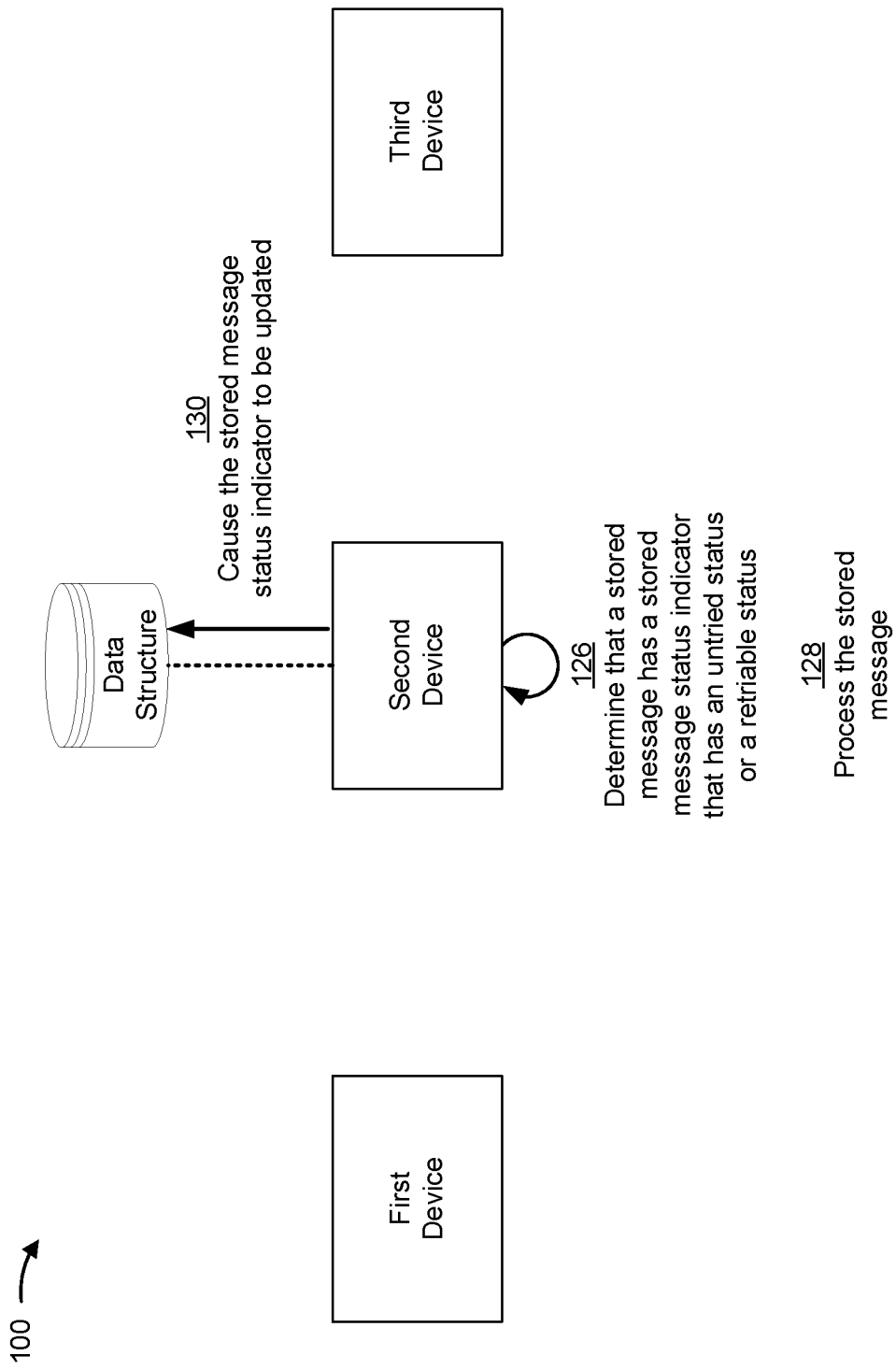

As shown in FIG. 1F, the second device may periodically (e.g., on a scheduled basis, on an on-demand basis, on a triggered basis, on an ad hoc basis, and/or the like) communicate with the data structure associated with the second device to identify one or more stored messages in the data structure. As shown by reference number 126, the second device may determine that a stored message in the data structure is associated with a stored message status indicator that indicates that the stored message has an untried status or a retriable status.

As shown by reference number 128, the second device may process the stored message in a similar manner as described herein in relation to FIG. 1C. For example, the second device may process the message to perform at least one action, such as generate an additional message. The second device may cause the additional message to include an additional identifier, of the at least one additional identifier, that was stored with the stored message in the data structure (e.g., the second device may add the additional identifier to the additional message).

As shown by reference number 130, the second device may cause the stored message status indicator in the data structure to be updated in a similar manner as discussed herein in relation to FIG. 1D. For example, the second device may determine whether the stored message was processed successfully and may cause the stored message status indicator to indicate that the stored message was successfully processed or that the stored message was not successfully processed (e.g., cause the stored message status indicator to indicate a retriable status or a terminal status).

Other implementations are contemplated with regard to example implementation(s) 100. In some implementations, the second device may obtain one or more messages from the first device in a similar manner as discussed herein in relation to FIG. 1A. For example, the second device may periodically poll (e.g., on a scheduled basis, on an on-demand basis, on a triggered basis, on an ad hoc basis, and/or the like) a messaging bus, such as a Kafka messaging bus, to obtain the one or more messages, such as one or more Kafka messages. Each message may include a respective identifier, such as a UUID, that identifies the message For each message, of the one or more messages, the second device may determine whether the second device has previously received the message, in a similar manner as described herein in relation to FIGS. 1A and 1E. When the second device determines that the second device has not previously received the message, the second device may generate at least one additional identifier and/or message status indicator in a similar manner as described herein in relation to FIG. 1B. For example the additional identifier may be a UUID and/or the message status indicator may indicate that the message has an untried status. The front-end device may cause the additional identifier, the message, and/or the message status indicator to be stored in a data structure associated with the second device. Additionally, the second device may process the message to perform at least one action in a similar manner as described herein in relation to FIG. 1C. For example, the second device may process the message to generate an additional message that includes the additional identifier. The second device may send the additional message to the third device in a similar manner as described herein in relation to FIG. 1D. For example, the second device may add the additional message to a messaging bus and/or the third device may periodically poll the messaging bus (e.g., on a scheduled basis, on an on-demand basis, on a triggered basis, on an ad hoc basis, and/or the like) to obtain the additional message.

After causing respective processing of each message, of the one or more messages, the second device may send an acknowledgment status to the first device in a similar manner as described herein in relation to FIG. 1C. The acknowledgment status may indicate that the second device successfully received and/or processed the one or more messages. The first device may cause a commit offset associated with the one or more messages (e.g., for a Kafka message bus) to be updated based on the acknowledgment status.

In some implementations, after sending the acknowledgment status to the first device, the second device may cause a respective message status indicator associated with each message, of the one or more messages, to be updated in the data structure in a similar manner as described herein in relation to FIG. 1D. For example, for each message, of the one or more messages, the second device may determine whether the message was processed successfully and may cause the message status indicator associated with the message to indicate that the message was successfully processed or that the message was not successfully processed (e.g., cause the message status indicator to indicate a retriable status or a terminal status).

Some implementations describe the second device performing one or more functions described herein in relation to FIGS. 1A-1E in a synchronous, but implementations may include the second device performing some or all of the one or more functions in an asynchronous manner. For example, the second device may perform a first set of the one or more functions in a first thread and may perform a second set of the one or more function in a second thread at the same time. As another example, the second device may perform one or more functions shown in FIGS. 1A-1B using a first thread, may perform one or more functions shown in FIGS. 1C-1D using a second thread, may perform one or more functions shown in FIG. 1E using a third thread, may perform one or more functions shown in FIG. 1F using a fourth thread, and/or the like. The second device may asynchronously execute two or more of the first thread, the second thread, the third thread, and/or the fourth thread.

As indicated above, FIGS. 1A-1F are provided as an example. Other examples may differ from what is described with regard to FIGS. 1A-1F.

Figure 2:
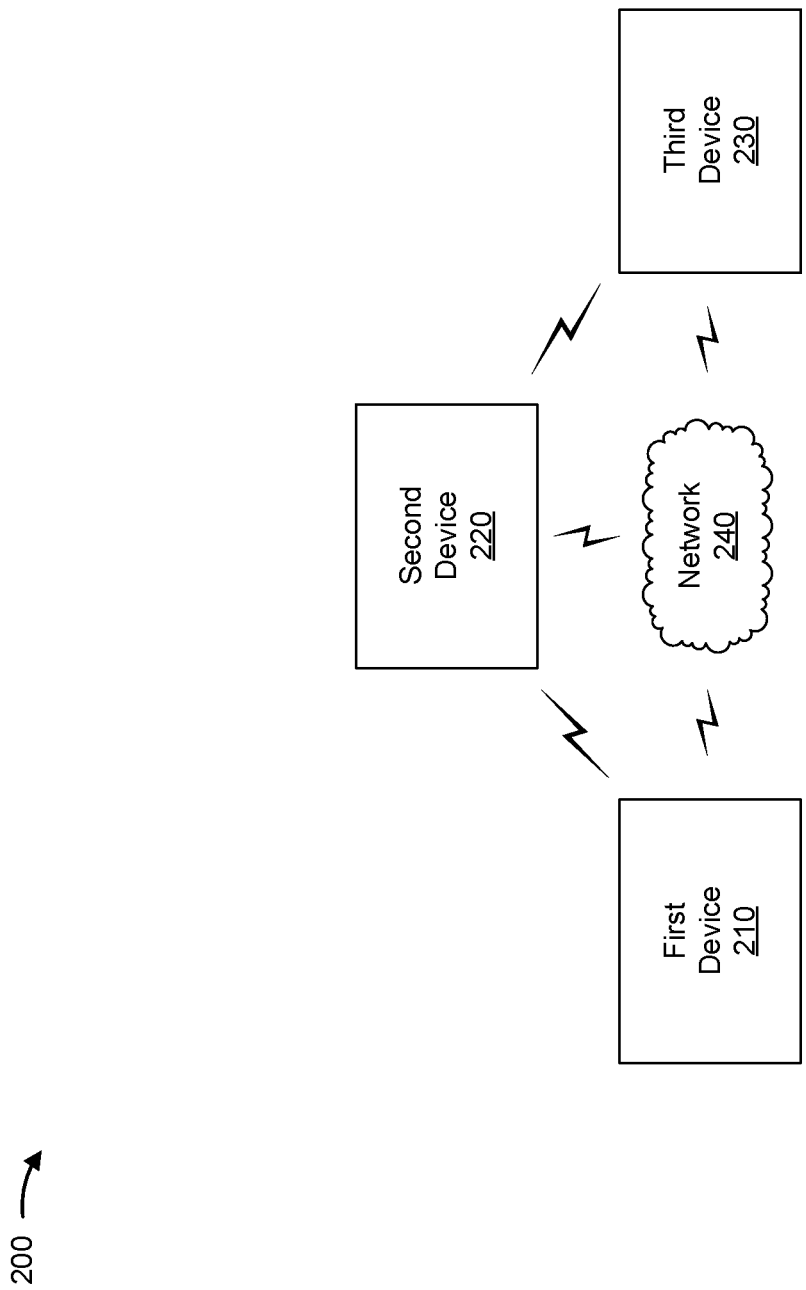
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a first device 210, a second device 220, a third device 230, a network 240, and/or the like. Devices of environment 200 may interconnect via wired connections, wireless connections, or a combination of wired and wireless connections.

First device 210 includes one or more devices capable of receiving, generating, storing, processing, analyzing, and/or providing information, such as information described herein. For example, first device 210 may include computer (e.g., a desktop computer, a laptop computer, a tablet computer, a handheld computer, and/or the like), a server, a group of servers, or a similar type of device. In some implementations, first device 210 may receive information from and/or transmit information to second device 220, and/or the like.

Second device 220 includes one or more devices capable of receiving, generating, storing, processing, and/or providing information, such as information described herein. For example, second device 220 may include a computer (e.g., a desktop computer, a laptop computer, a tablet computer, a handheld computer, and/or the like), a server, a group of servers, or a similar type of device. In some implementations, second device 220 may include a data structure. In some implementations, second device 220 may receive information from and/or transmit information to first device 210 and/or third device 230.

Third device 230 includes one or more devices capable of receiving, generating, storing, processing, and/or providing information, such as information described herein. For example, third device 230 may include computer (e.g., a desktop computer, a laptop computer, a tablet computer, a handheld computer, and/or the like), a server, a group of servers, or a similar type of device. In some implementations, third device 230 may receive information from and/or transmit information to second device 220.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
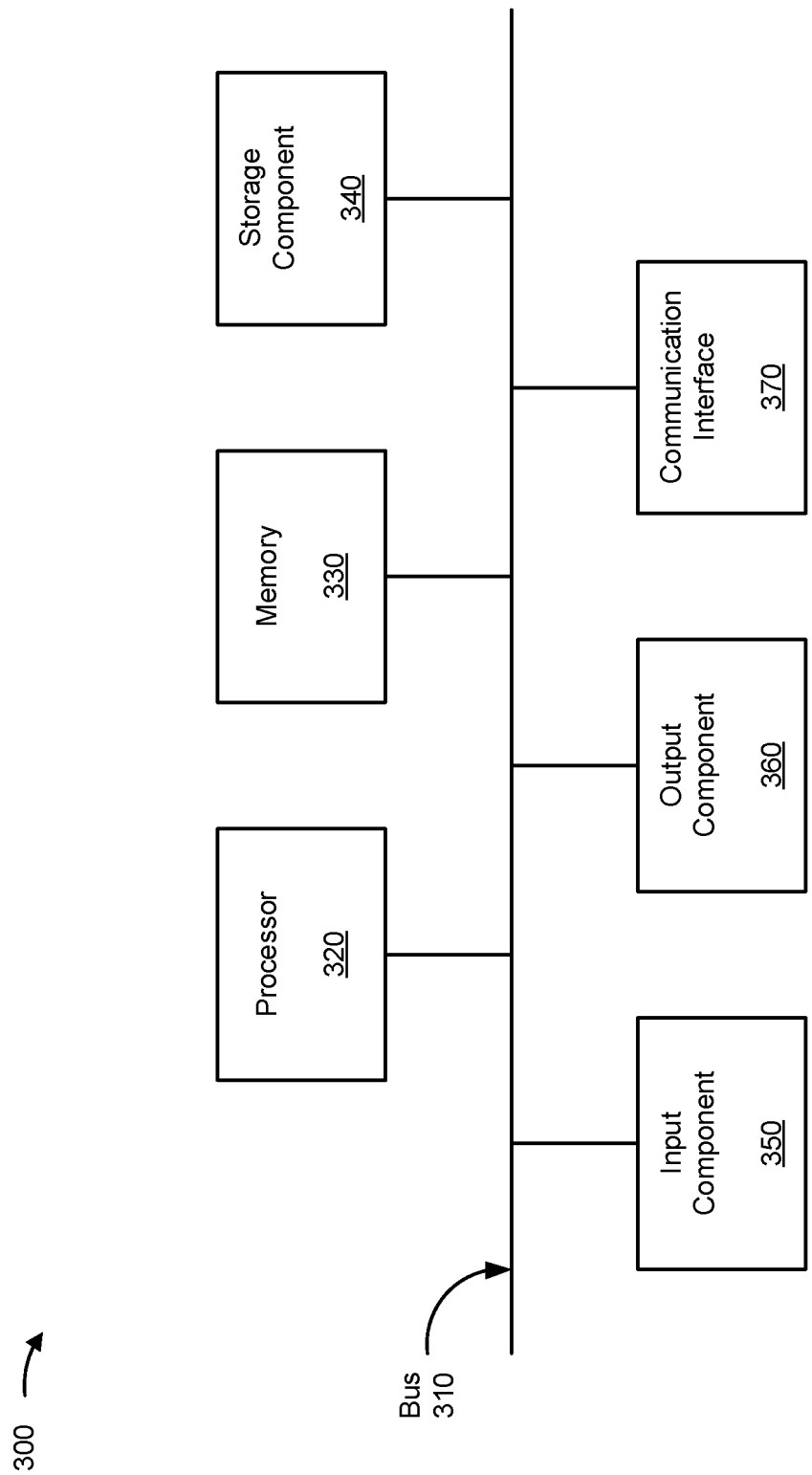
FIG. 3 is a diagram of example components of one or more devices of FIG. 2.

FIG. 3 is a diagram of example components of a device 300. Device 300 may correspond to first device 210, second device 220, third device 230, and/or the like. In some implementations, first device 210, second device 220, third device 230, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
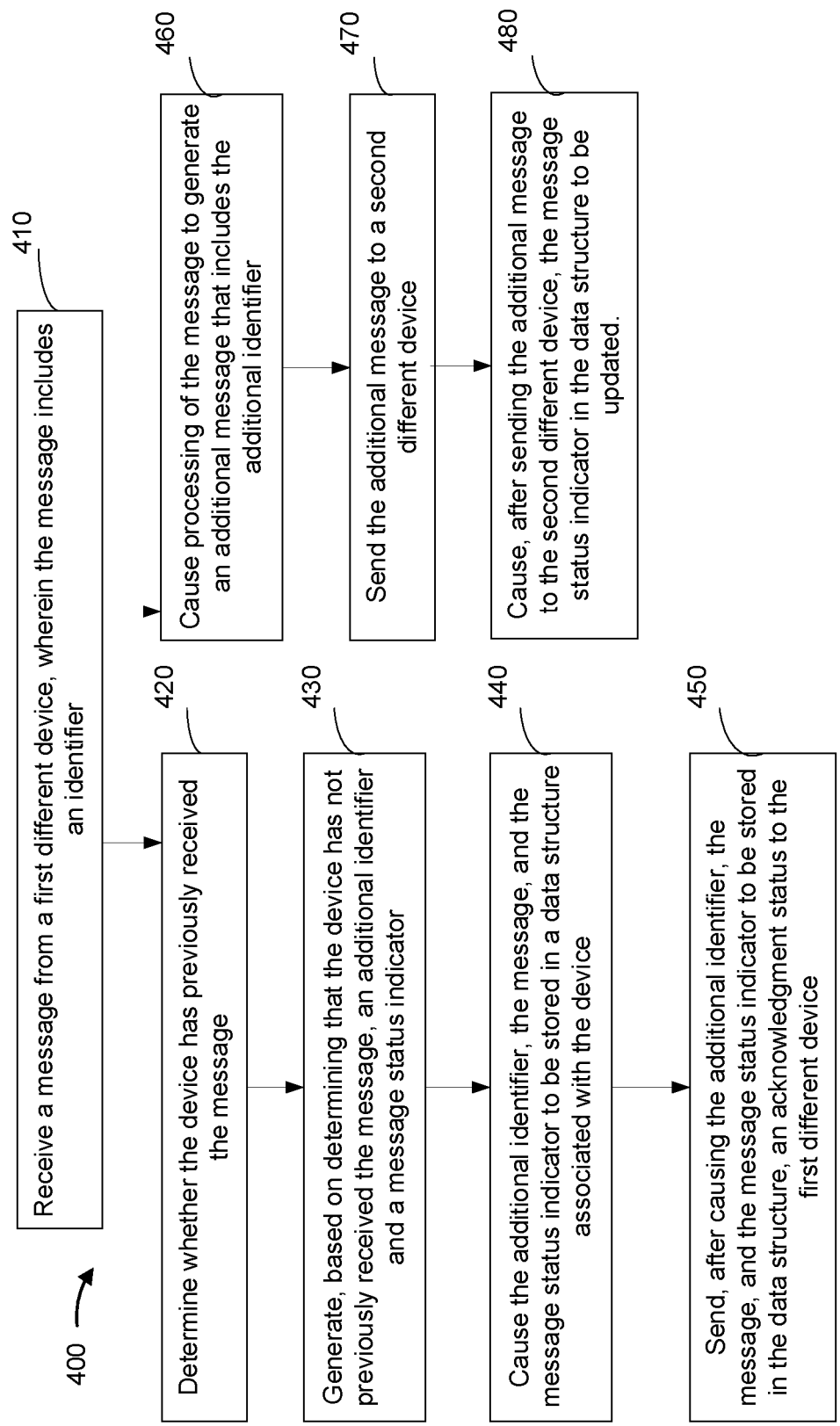
FIGS. 4-6 are flow charts of example processes for facilitating resilient and fault tolerant asynchronous messaging.

FIG. 4 is a flow chart of an example process 400 for facilitating resilient and fault tolerant asynchronous messaging. In some implementations, one or more process blocks of FIG. 4 may be performed by a device (e.g., second device 220). In some implementations, one or more process blocks of FIG. 4 may be performed by another device or a group of devices separate from or including the device, such as a first different device (e.g., first device 210), a second different device (e.g., third device 230), and/or the like.

As shown in FIG. 4, process 400 may include receiving a message from a first different device, wherein the message includes an identifier (block 410). For example, the device (e.g., using processor 320, memory 330, storage component 340, input component 350, output component 360, communication interface 370 and/or the like) may receive a message from a first different device, as described above. In some implementations, the message includes an identifier.

As further shown in FIG. 4, process 400 may include determining whether the device has previously received the message (block 420). For example, the device (e.g., using processor 320, memory 330, storage component 340, input component 350, output component 360, communication interface 370 and/or the like) may determine whether the device has previously received the message, as described above.

As further shown in FIG. 4, process 400 may include generating, based on determining that the device has not previously received the message, an additional identifier and a message status indicator (block 430). For example, the device (e.g., using processor 320, memory 330, storage component 340, input component 350, output component 360, communication interface 370 and/or the like) may generate, based on determining that the device has not previously received the message, an additional identifier and a message status indicator, as described above.

As further shown in FIG. 4, process 400 may include causing the additional identifier, the message, and the message status indicator to be stored in a data structure associated with the device (block 440). For example, the device (e.g., using processor 320, memory 330, storage component 340, input component 350, output component 360, communication interface 370 and/or the like) may cause the additional identifier, the message, and the message status indicator to be stored in a data structure associated with the device, as described above.

As further shown in FIG. 4, process 400 may include sending, after causing the additional identifier, the message, and the message status indicator to be stored in the data structure, an acknowledgment status to the first different device (block 450). For example, the device (e.g., using processor 320, memory 330, storage component 340, input component 350, output component 360, communication interface 370 and/or the like) may send, after causing the additional identifier, the message, and the message status indicator to be stored in the data structure, an acknowledgment status to the first different device, as described above.

As further shown in FIG. 4, process 400 may include causing processing of the message to generate an additional message that includes the additional identifier (block 460). For example, the device (e.g., using processor 320, memory 330, storage component 340, input component 350, output component 360, communication interface 370 and/or the like) may cause processing of the message to generate an additional message that includes the additional identifier, as described above.

As further shown in FIG. 4, process 400 may include sending the additional message to a second different device (block 470). For example, the device (e.g., using processor 320, memory 330, storage component 340, input component 350, output component 360, communication interface 370 and/or the like) may send the additional message to a second different device, as described above.

As further shown in FIG. 4, process 400 may include causing, after sending the additional message to the second different device, the message status indicator in the data structure to be updated (block 480). For example, the device (e.g., using processor 320, memory 330, storage component 340, input component 350, output component 360, communication interface 370 and/or the like) may cause, after sending the additional message to the second different device, the message status indicator in the data structure to be updated, as described above.

Process 400 may include additional implementations, such as any single implementation or any combination of implementations described below and/or in connection with one or more other processes described elsewhere herein.

In some implementations, receiving the message from the first different device comprises receiving the message from the first different device via an application programming interface (API). In some implementations, sending the acknowledgment status to the first different device comprises sending the acknowledgment status to the first different device via the API.

In some implementations, determining whether the device has previously received the message comprises identifying the identifier included in the message, and determining whether any stored message in the data structure is associated with the identifier.

In some implementations, generating the additional identifier and the message status indicator comprises generating the additional identifier to be a universally unique identifier (UUID), and generating the message status indicator to indicate that the message has an untried status.

In some implementations, sending the additional message to the second different device comprises sending the additional message to the second different device via a messaging bus.

In some implementations, causing the message status indicator in the data structure to be updated comprises causing the message status indicator to indicate that the message was successfully processed.

In some implementations, the device may determine that a stored message in the data structure is associated with a stored message status indicator that indicates that the stored message has an untried status or a retriable status; may cause processing of the stored message; and may cause, after processing of the stored message, the stored message status indicator in the data structure to be updated to indicate that the stored message was successfully processed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
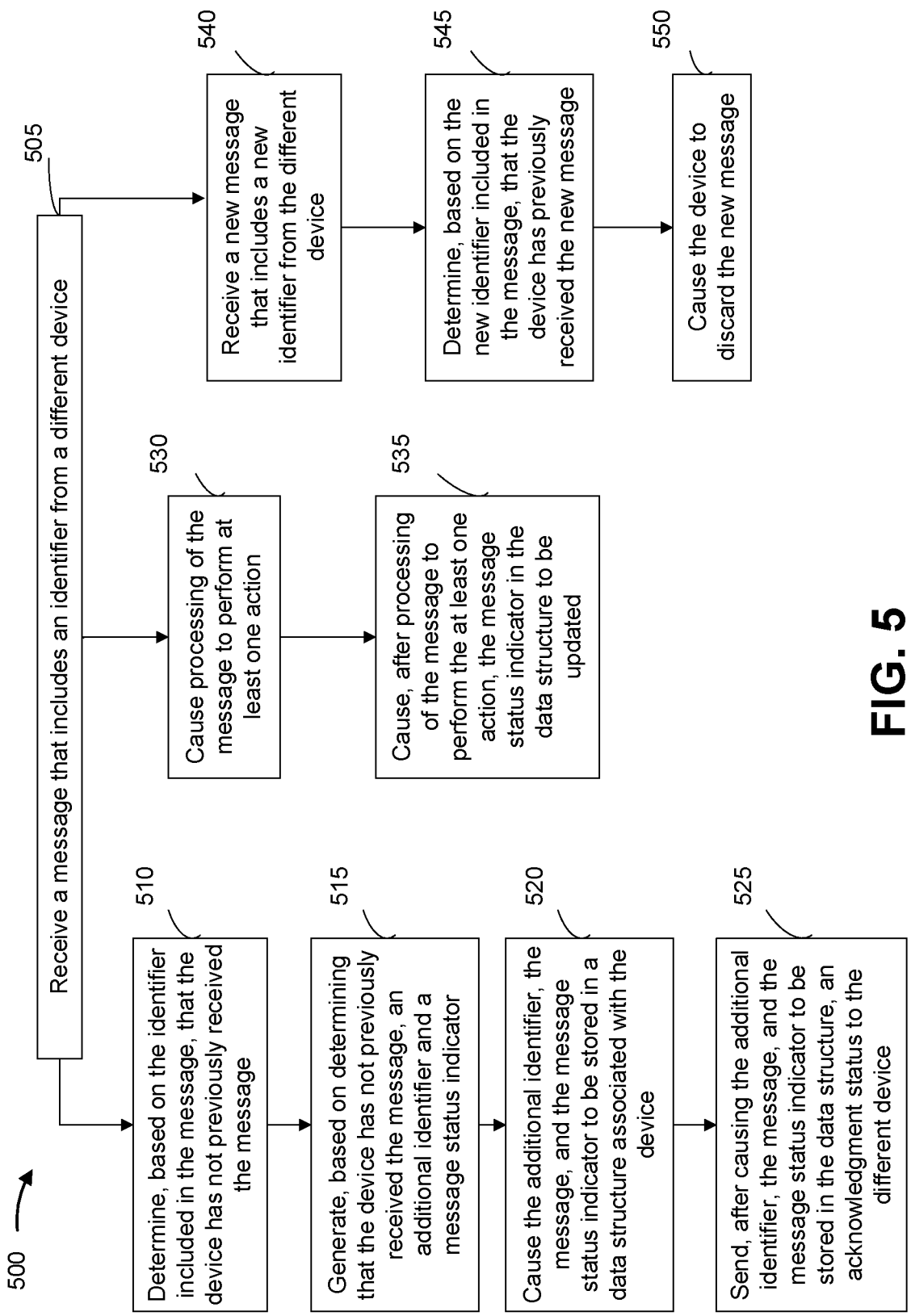

FIG. 5 is a flow chart of an example process 500 for facilitating resilient and fault tolerant asynchronous messaging. In some implementations, one or more process blocks of FIG. 5 may be performed by a device (e.g., second device 220). In some implementations, one or more process blocks of FIG. 5 may be performed by another device or a group of devices separate from or including the device, such as a first different device (e.g., first device 210), a second different device (e.g., third device 230), and/or the like.

As shown in FIG. 5, process 500 may include receiving a message that includes an identifier from a different device (block 505). For example, the device (e.g., using processor 320, memory 330, storage component 340, input component 350, output component 360, communication interface 370 and/or the like) may receive a message that includes an identifier from a different device, as described above.

As further shown in FIG. 5, process 500 may include determining, based on the identifier included in the message, that the device has not previously received the message (block 510). For example, the device (e.g., using processor 320, memory 330, storage component 340, input component 350, output component 360, communication interface 370 and/or the like) may determine, based on the identifier included in the message, that the device has not previously received the message, as described above.

As further shown in FIG. 5, process 500 may include generating, based on determining that the device has not previously received the message, an additional identifier and a message status indicator (block 515). For example, the device (e.g., using processor 320, memory 330, storage component 340, input component 350, output component 360, communication interface 370 and/or the like) may generate, based on determining that the device has not previously received the message, an additional identifier and a message status indicator, as described above.

As further shown in FIG. 5, process 500 may include causing the additional identifier, the message, and the message status indicator to be stored in a data structure associated with the device (block 520). For example, the device (e.g., using processor 320, memory 330, storage component 340, input component 350, output component 360, communication interface 370 and/or the like) may cause the additional identifier, the message, and the message status indicator to be stored in a data structure associated with the device, as described above.

As further shown in FIG. 5, process 500 may include sending, after causing the additional identifier, the message, and the message status indicator to be stored in the data structure, an acknowledgment status to the different device (block 525). For example, the device (e.g., using processor 320, memory 330, storage component 340, input component 350, output component 360, communication interface 370 and/or the like) may send, after causing the additional identifier, the message, and the message status indicator to be stored in the data structure, an acknowledgment status to the different device, as described above.

As further shown in FIG. 5, process 500 may include causing processing of the message to perform at least one action (block 530). For example, the device (e.g., using processor 320, memory 330, storage component 340, input component 350, output component 360, communication interface 370 and/or the like) may cause processing of the message to perform at least one action, as described above.

As further shown in FIG. 5, process 500 may include causing, after processing of the message to perform the at least one action, the message status indicator in the data structure to be updated (block 535). For example, the device (e.g., using processor 320, memory 330, storage component 340, input component 350, output component 360, communication interface 370 and/or the like) may cause, after processing of the message to perform the at least one action, the message status indicator in the data structure to be updated, as described above.

As further shown in FIG. 5, process 500 may include receiving, after causing the message status indicator in the data structure to be updated, a new message that includes a new identifier from the different device (block 540). For example, the device (e.g., using processor 320, memory 330, storage component 340, input component 350, output component 360, communication interface 370 and/or the like) may receive, after causing the message status indicator in the data structure to be updated, a new message that includes a new identifier from the different device, as described above.

As further shown in FIG. 5, process 500 may include determining, based on the new identifier included in the message, that the device has previously received the new message (block 545). For example, the device (e.g., using processor 320, memory 330, storage component 340, input component 350, output component 360, communication interface 370 and/or the like) may determine, based on the new identifier included in the message, that the device has previously received the new message, as described above.

As further shown in FIG. 5, process 500 may include causing the device to discard the new message (block 550). For example, the device (e.g., using processor 320, memory 330, storage component 340, input component 350, output component 360, communication interface 370 and/or the like) may cause the device to discard the new message, as described above.

Process 500 may include additional implementations, such as any single implementation or any combination of implementations described below and/or in connection with one or more other processes described elsewhere herein.

In some implementations, the message and the new message are representational state transfer (REST) requests. In some implementations, the acknowledgment status indicates that the device received the message.

In some implementations, the device, when causing processing of the message to perform an action, may process the message to generate an additional message that includes the additional identifier and may send the additional message to an additional device.

In some implementations, the device, when determining that the device has previously received the new message, may parse the new message to identify the new identifier included in the message; may search the data structure based on the new identifier; and may determine, based on searching the data structure, that a stored message is associated with a stored identifier that matches the new identifier.

In some implementations, the device, when causing the message status indicator in the data structure to be updated, may determine whether the message was processed successfully and may cause, based on determining that the message was processed successfully, the message status indicator to indicate that the message was successfully processed.

In some implementations, the device, when causing the message status indicator in the data structure to be updated, may determine whether the message was processed successfully; may determine, based on determining that the message was not processed successfully, that processing of the message is retriable; and may cause, based on determining that the processing of the message is retriable, the message status indicator to indicate a retriable status.

In some implementations, the device, when causing the message status indicator in the data structure to be updated, may determine whether the message was processed successfully; may determine, based on determining that the message was not processed successfully, that processing of the message is not retriable; and may cause, based on determining that the processing of the message is not retriable, the message status indicator to indicate a terminal status.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
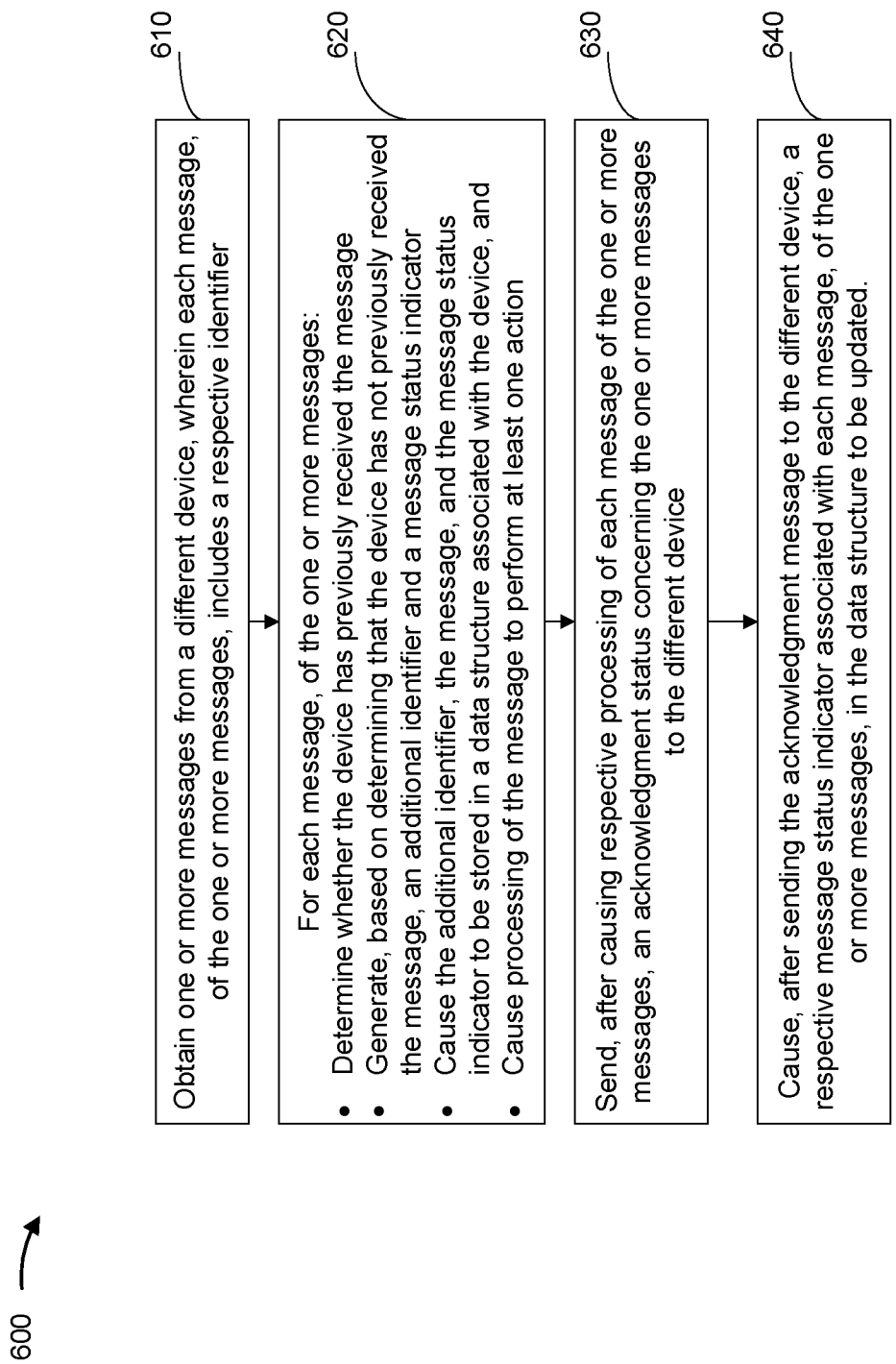

FIG. 6 is a flow chart of an example process 600 for facilitating resilient and fault tolerant asynchronous messaging. In some implementations, one or more process blocks of FIG. 6 may be performed by a device (e.g., second device 220). In some implementations, one or more process blocks of FIG. 6 may be performed by another device or a group of devices separate from or including the device, such as a first different device (e.g., first device 210), a second different device (e.g., third device 230), and/or the like.

As shown in FIG. 6, process 600 may include obtaining one or more messages from a different device wherein each message, of the one or more messages, includes a respective identifier (block 610). For example, the device (e.g., using processor 320, memory 330, storage component 340, input component 350, output component 360, communication interface 370 and/or the like) may obtain one or more messages from a different device, as described above. In some implementations, each message, of the one or more messages, includes a respective identifier.

As shown in FIG. 6, process 600 may include, for each message, of the one or more messages, determining whether the device has previously received the message; generating, based on determining that the device has not previously received the message, an additional identifier and a message status indicator; causing the additional identifier, the message, and the message status indicator to be stored in a data structure associated with the device; and causing processing of the message to perform at least one action (block 620). For example, the device (e.g., using processor 320, memory 330, storage component 340, input component 350, output component 360, communication interface 370 and/or the like) may, for each message, of the one or more messages, determine whether the device has previously received the message; generate, based on determining that the device has not previously received the message, an additional identifier and a message status indicator; cause the additional identifier, the message, and the message status indicator to be stored in a data structure associated with the device; and cause processing of the message to perform at least one action, as described above.

As further shown in FIG. 6, process 600 may include sending, after causing respective processing of each message of the one or more messages, an acknowledgment status concerning the one or more messages to the different device (block 630). For example, the device (e.g., using processor 320, memory 330, storage component 340, input component 350, output component 360, communication interface 370 and/or the like) may send, after causing respective processing of each message of the one or more messages, an acknowledgment status concerning the one or more messages to the different device, as described above.

As further shown in FIG. 6, process 600 may include causing, after sending the acknowledgment status to the different device, a respective message status indicator associated with each message, of the one or more messages, in the data structure to be updated (block 640). For example, the device (e.g., using processor 320, memory 330, storage component 340, input component 350, output component 360, communication interface 370 and/or the like) may cause, after sending the acknowledgment status to the different device, a respective message status indicator associated with each message, of the one or more messages, in the data structure to be updated, as described above.

Process 600 may include additional implementations, such as any single implementation or any combination of implementations described below and/or in connection with one or more other processes described elsewhere herein.

In some implementations, the device, when obtaining the one or more messages from the different device, may poll a messaging bus for messages and may obtain the one or more messages via the messaging bus. In some implementations, the messaging bus is a Kafka messaging bus.

In some implementations, sending the acknowledgment status to the different device causes a commit offset associated with the one or more messages to be updated.

In some implementations, the device may determine that one or more stored messages in the data structure are to be processed; may cause processing of at least one stored message of the one or more stored messages; and may cause, after causing processing of the at least one stored message of the one or more stored messages, a stored message status indicator associated with the at least one stored message in the data structure to be updated.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device, a message from a first different device,
    wherein the message includes an identifier;
  determining, by the device, whether the device has previously received the message;
  generating, by the device and based on determining that the device has not previously received the message, an additional identifier and a message status indicator;

causing, by the device, the additional identifier, the message, and the message status indicator to be stored in a data structure associated with the device;
sending, by the device and after causing the additional identifier, the message, and the message status indicator to be stored in the data structure, an acknowledgment status to the first different device;
causing, by the device, processing of the message to generate an additional message that includes the additional identifier;
sending, by the device, the additional message to a second different device; and
causing, by the device and after sending the additional message to the second different device, the message status indicator in the data structure to be updated,
the updated message status indicator indicating that the additional message was processed successfully;
receiving, by the device, a new message that includes a new identifier from the first different device;
determining, by the device and based on the new identifier included in the message, that the device has previously received the new message; and
causing, by the device, the new message to be discarded.

2. The method of claim 1, wherein the message is one of:
a representational state transfer (REST) request, or
a microservice event message.

3. The method of claim 1, further comprising:
periodically communicating with the data structure to identify one or more stored messages in the data structure.

4. The method of claim 1, wherein the additional identifier is a universally unique identifier (UUID), and
wherein the message status indicator indicates that the message has an untried status.

5. The method of claim 1, wherein sending the additional message to the second different device comprises:
sending the additional message to the second different device via a messaging bus.

6. The method of claim 1, wherein receiving the message from the first different device comprises:
receiving the message from the first different device via an application programming interface (API),
wherein sending the acknowledgment status to the first different device comprises:
sending the acknowledgment status to the first different device via the API.

7. The method of claim 1, wherein determining whether the device has previously received the message comprises:
identifying the identifier included in the message; and
determining whether any stored message in the data structure is associated with the identifier.

8. A device, comprising:
one or more memories; and
one or more processors, communicatively coupled to the one or more memories, configured to:
receive a message that includes an identifier from a different device;
determine, based on the identifier included in the message, that the device has not previously received the message;
generate, based on determining that the device has not previously received the message, an additional identifier and a message status indicator;
cause the additional identifier, the message, and the message status indicator to be stored in a data structure associated with the device;
send, after causing the additional identifier, the message, and the message status indicator to be stored in the data structure, an acknowledgment status to the different device;
cause processing of the message to perform at least one action;
determine whether the message was processed successfully;
cause, after determining that the message was not processed successfully, the message status indicator in the data structure to be updated to indicate whether the message is retriable or not retriable;
cause, after determining that the message status indicator indicates that the message has a retriable or not retriable status, processing of the message; and
cause, after processing of the message, the message status indicator to be updated to indicate that the message was successfully processed.

9. The device of claim 8, wherein the one or more processor are further configured to:
receive a new message that includes a new identifier from the different device;
determine, based on the new identifier included in the message, that the device has previously received the new message; and
cause the new message to be discarded.

10. The device of claim 9, wherein the device receives the new message from the different device via at least one of:
an application programming interface (API), or
a messaging bus.

11. The device of claim 9, wherein the one or more processors, when receiving the new message, are further to:
poll a messaging bus for messages; and
obtain the message and the new message via the messaging bus.

12. The device of claim 9, wherein the one or more processors, when determining that the device has previously received the new message, are configured to:
parse the new message to identify the new identifier included in the message;
search the data structure based on the new identifier; and
determine, based on searching the data structure, that a stored message is associated with a stored identifier that matches the new identifier.

13. The device of claim 8, wherein the one or more processors are further to:
cause processing of the message to update an account based on information included in the message.

14. The device of claim 8, wherein the acknowledgment status indicates that the device received the message.

15. A non-transitory computer-readable medium storing instructions, the instructions comprising:
one or more instructions that, when executed by one or more processors of a device, cause the one or more processors to:
obtain one or more messages from a different device,
wherein each message, of the one or more messages, includes a respective identifier, and
wherein, for each message, of the one or more messages, the one or more instructions, when executed by the one or more processors, cause the one or more processors to:
determine whether the device has previously received each message of the one or more messages, generate, based on determining that the device has not previously received the message, an additional identifier and a message status indicator, cause the additional identifier, the message, and the message status indicator to be stored in a data structure associated with the device, and cause processing of the message to perform at least one action;

send, after causing respective processing of each message of the one or more messages, an acknowledgment status concerning the one or more messages to the different device; and cause, after sending the acknowledgment status to the different device, a respective message status indicator associated with each message, of the one or more messages, in the data structure to be updated, wherein the respective message status indicator associated with each message indicates whether each message was processed successfully; and determine that a stored message in the data structure is to be processed, wherein, when the stored message is processed, a stored message status indicator associated with the stored message is updated to indicate that the stored message was processed.

16. The non-transitory computer-readable medium of claim 15, wherein the one or more instructions, when executed by the one or more processors, further cause the one or more processors to:

cause processing of the message to update an account based on information included in the message.

17. The non-transitory computer-readable medium of claim 15, wherein the one or more instructions, when executed by the one or more processors, further cause the one or more processors to:

periodically communicate with the data structure to identify one or more stored messages in the data structure.

18. The non-transitory computer-readable medium of claim 15, wherein the one or more instructions, that cause the one or more processors to obtain the one or more messages from the different device, cause the one or more processors to:

poll a messaging bus for messages; and obtain the one or more messages via the messaging bus.

19. The non-transitory computer-readable medium of claim 18, wherein the acknowledgment status indicates that the device received the message.

20. The non-transitory computer-readable medium of claim 15, wherein sending the acknowledgment status to the different device causes a commit offset associated with the one or more messages to be updated.

* * * * *